United States Patent Office 3,257,894
Patented June 28, 1966

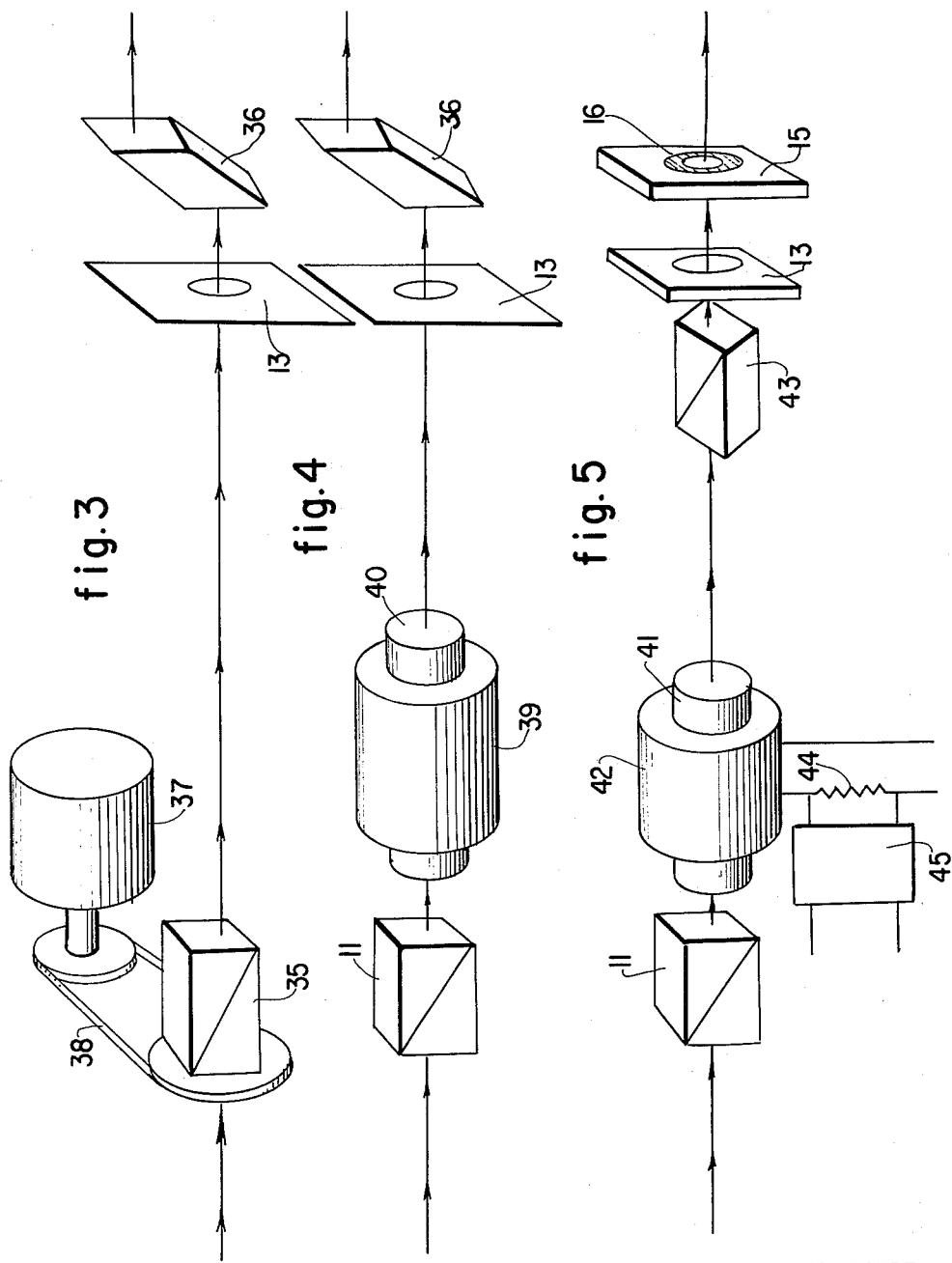

3,257,894
REGISTERING APPARATUS FOR MEASURING CIRCULAR DICHROISM
Marc Grosjean, Paris, France, assignor to Roussel-Uclaf, S.A., Paris, France, a corporation of France
Filed June 27, 1961, Ser. No. 119,963
Claims priority, application France, June 29, 1960, 831,496
11 Claims. (Cl. 88—14)

This invention relates generally to polarimetry and particularly to a registering spectro-dichrograph.

This invention has for its object a novel industrial product, a registering apparatus for measuring circular dichroism, suitable to register the variations as a function of the wave length of the difference in coefficients of molecular absorption of a dichroic product with reference to left circular light $\epsilon_g$ and right circular light $\epsilon_d$.

The measure of this physical property is of considerable interest in the determination of structures of optically active products, and this method surpasses in effectiveness that utilizing the rotatory dispersion. Until the present this advance had been hindered by the very great experimental difficulties which occur in this type of determination.

The object of the present invention is the realization of a practical apparatus allowing rapid registration (in a time of the order of 10 minutes) of the circular dichroism curve $\epsilon_g - \epsilon_d$ in the ultra-violet and visible spectra.

It is known that an optically active product has a refractive index and an absorption which are different for left circular light and right circular light. Consequently, on one hand, the rotation of the plane of polarization of a linear polarized light, and on the other hand, the elliptization of this light in the absorption zone occurs. Nearly all the previous methods of measuring circular dichroism have taken advantage of this elliptization of the light in order to arrive at $\epsilon_g$ and $\epsilon_d$ but it is difficult to attempt easily and rapidly the measure of ellipticity caused by a dichroism whose amplitude is extremely weak and which, from this fact, is found submerged in accidential birefringence of the different optical parts of the apparatus.

The present invention is based on the elementary phenomenon of circular dichroism, that is, on the difference of absorption between the left circular polarized light and the right circular light.

The optical assembly is composed principally of an intense source of light emitting in the ultra-violet and visible regions, an optical monochromator of quartz, an apparatus giving plane polarized light, a system which is called a polarization modulator transforming at an alternating current frequency $f$, this plane light into a left circular light, then into a right circular light, which passes successively through all the intermediary elliptical light phases, a sample cell containing the active solution, and of a sensitive photomultiplier.

Applicant has found that the outlet voltage of the photomultiplier is composed of a direct current component and an alternating current component of frequency $f$ direct current component $$V_C = K\frac{\Phi_0}{2}(e^{-\epsilon_g Cl} + e^{-\epsilon_d Cl}) \quad (1)$$

alternating current component $$V_A = K\frac{\Phi_0}{2}(e^{-\epsilon_g Cl} - e^{-\epsilon_d Cl}) \sin [f(\Omega t)] \quad (2)$$

$\Phi_0$ = luminous monochromatic linear polarized flux
$K$ = coefficient of transformation light flux/output voltage of photomultiplier $\epsilon_g$, $\epsilon_d$ = coefficients of molecular absorption exponentially to the base $e$
$C$ = molecular concentration
$l$ = thickness of the solution traversed
$f(\Omega t)$ = function of the frequency whose form depends on the type of modulator utilized
$\Omega = 2\pi f$ The two components may be easily separated electronically.

The alternating current is amplified by an amplifier allowing the passage without distortion of lower frequencies of $5f$ at least, then it is rectified in a full-wave averaging phase-sensitive rectifier, in phase with the excitation voltage of the circular polarization system. The rectified signal, proportional to:

$$e^{-\epsilon_g Cl} - e^{-\epsilon_d Cl}$$

is next applied to the input of a potentiometric registering recorder.

The direct current, after having been rendered symmetric with reference to the ground in a total feed back amplifier, is applied to the slidewire of the registering apparatus in such a way that the center of the potentiometric line is found at a voltage value of 0 and the extremities respectively at $+V_C/2$ and $-V_C/2$.

Under the conditions, the elongation of the pen of the registration apparatus is proportional to $(\epsilon_g - \epsilon_d)Cl$ where $(\epsilon_g - \epsilon_d)Cl$ is weak, and the sign of the dichroism is known.

In the drawings which illustrate the specific embodiments and preferred modes of carrying out my invention:

FIG. 3 is a view of a modification of the polarization modulator system.

FIG. 4 shows another modification of the polarization modulator system.

FIG. 5 represents a third modification applicable to the fixed polarizer apparatus of FIGS. 1 and 4.

Figure 1:
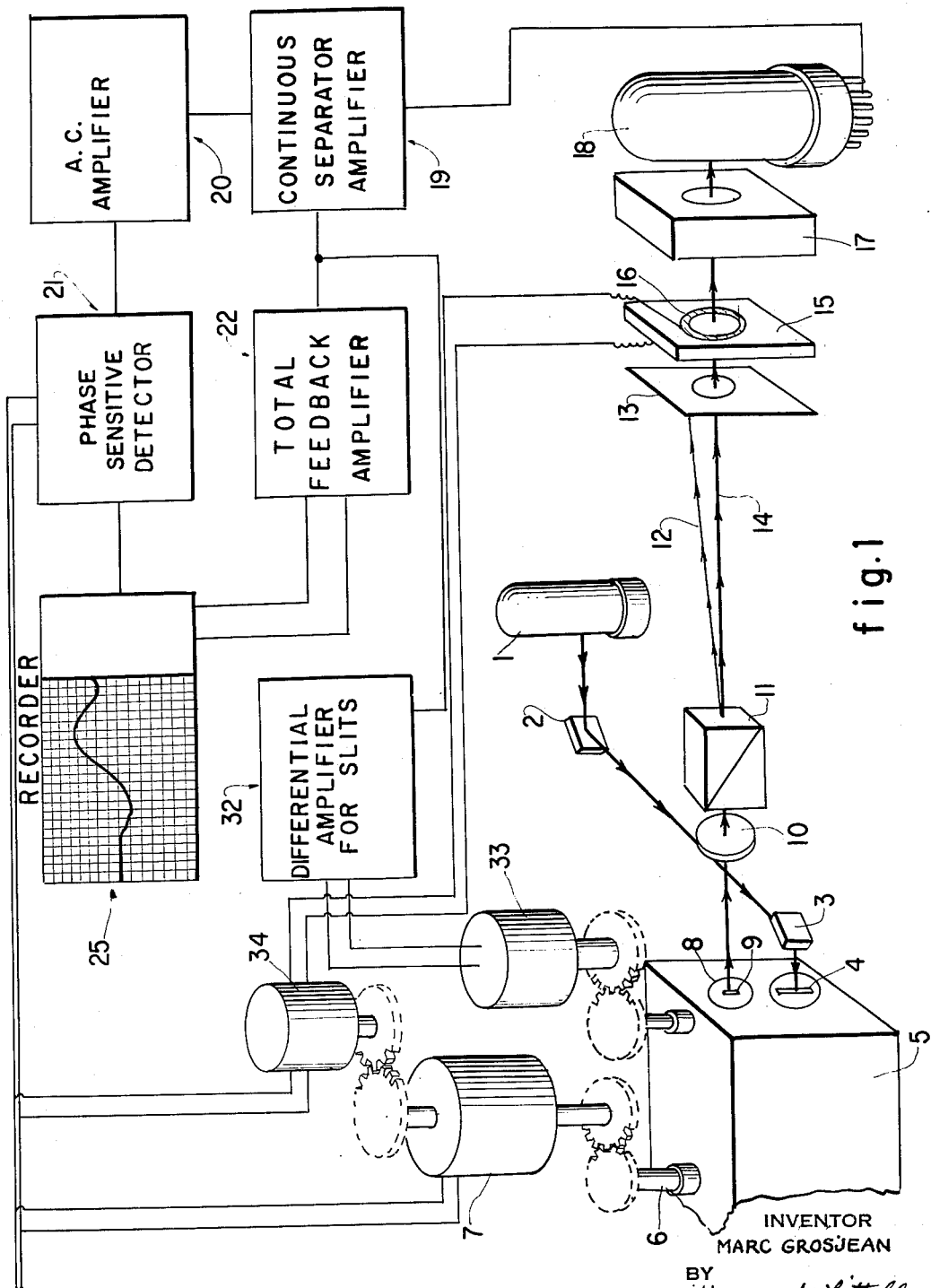
FIG. 1 is a schematic view of the assembly of the apparatus of my invention.

Referring now to the drawings in detail FIG. 1 illustrates a registering spectro-dichrograph pursuant to the present invention. The apparatus comprises source 1 comprising a hydrogen or xenon arc fed with stabilised D.C. current. The light flux is directed by mirrors 2 and 3 on the entrance slit 4 of a monochromator 5, having quartz optic, for example of the "Beckman DU" type, whose axis of dispersive system 6 is driven by a synchronous motor 7. The axis of the dispersive system is tuned as a function of time according to a reproduceable and known law. A diaphragm 8 is placed on the exit slit 9 and serves as a source of monochromatic light for the following part of the apparatus. The light rays proceeding from this source are rendered parallel by a silica lens 10, then traverse a Rochon prism 11 of quartz. The extraordinary beam 12 is eliminated by a diaphragm 13 conveniently placed, and the ordinary beam 14 traverses a crystal 15 conveniently cut of a substances presenting a Pockel effect (for example, a plate of monoammonium phosphate (A.D.P.)).

An alternating voltage at the frequency of 50 cycles, applied on two metallic electrodes 16 disposed on the two faces of the crystal 15, produces in the direction of the traverse of the plate by the light beam a birefringence which is increased as the voltage is increased.

The crystal face 15 is mounted in such fashion that the induced axes are at 45° from the plane of polarization of the incidental light 14.

The polarized light is elliptized thus more and more during a period of the alternating voltage, and becomes circular at the peak amplitude of the voltage, if this one is well adjusted. The Pockel effect depends on the direction of the electric field. There is obtained successively a left circular polarized light and a right circular polarized light.

With this modulator the function $f(\Omega t)$ of the Formula 2 takes the form $\Delta_0 \sin \Omega t$ where $\Delta_0$ is the angular retardation of the crystalline plate at the maximum of the energizing voltage.

Figure 2:
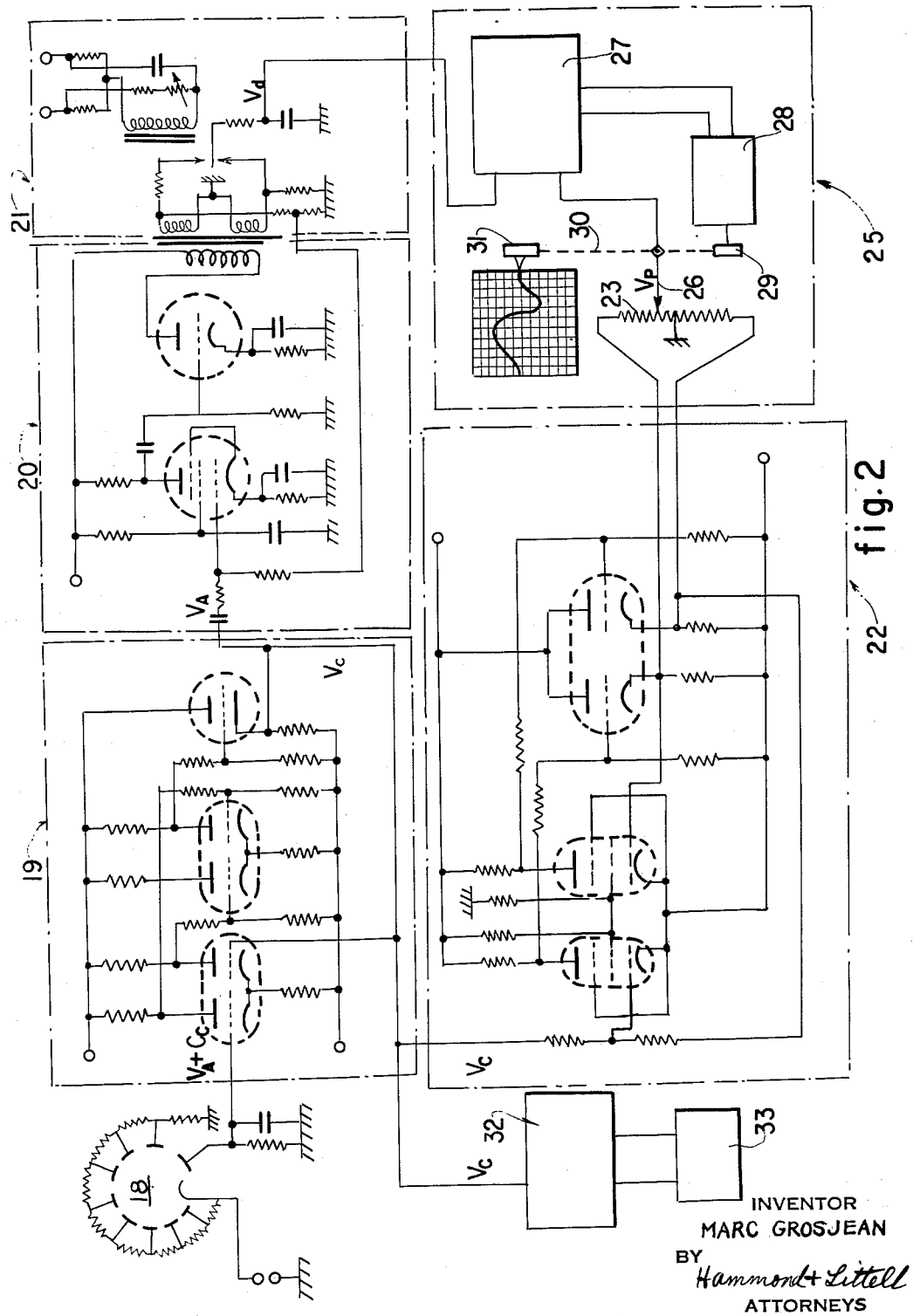
FIG. 2 is a circuit diagram of the electronic measuring apparatus of the invention.

The rays thus polarized traverse next the sample cell 17 containing the active product. Sample cell 17 is mounted with plane and parallel windows of silica. The rays fall finally on a photomultiplyer cell 18 of the type 1P28 sensitive to ultraviolet light. The total voltage at the output of the photomultiplier cell 18 is supplied to a continuous separator amplifier 19. The circuit for such an amplifier is shown in FIG. 2.

The alternating frequency component $V_a$ of the frequency $f$ taken from the output of amplifier 19 is amplified by amplifier 20 (see FIG. 2) and detected by a full-wave averaging phase-sensitive detector 21 fed in phase with the energizing voltage of the crystal. This provides detected current $V_d$.

This detection system allows the minimization of the disturbing effect of the background noise of the cell. On the other hand, in order to obtain the maximum of the detected signal, it is necessary to use an angular retardation $\delta_0$ greater than $\pi/2$. Consequently, at the maximum of modulation a quarter of a wave length is exceeded.

The direct current component $V_c$ of the signal taken from the output of amplifier 19 is rendered symmetric with reference to the ground in the total feed back single input differential amplifier 22, in which the mean level of the two output terminals is at ground potential and supplied to the slidewire 23 of the register 25. The voltage $V_p$ at the slide 26 of the potentiometer 23 is compared to the detected voltage $V_d$. The difference amplified by differential amplifier 27 actuates the motor 28 coupled to the slide 26 by the transmission formed from a pulley 29 and a small cable 30 controlling at the same time the pen 31 of register 25 in such a manner as to maintain the difference between the two currents practically zero.

There is registered thus the ratio of the alternating current component of the signal to the direct current component, the ratio being proportional to $(\epsilon_g - \epsilon_d)Cl$, if this term is rather small.

In order that the register functions correctly for all wave lengths, the direct current component leaving amplifier 19 (FIG. 2) is compared to a fixed voltage by a differential amplifier 32 which by the intermediary of motor 33 (FIGS. 1 and 2) acts on the slits 4 and 9 (FIG. 1) of the monochromator in such a manner as to maintain the direct current component nearly constant.

$\delta_0$ is maintained constant over the course of the spectra by adjusting the alternating voltage applied to polarization modulator 15 as a function of the wave length by the intermediary of a current variator 34 (FIG. 1) coupled to the axis of rotation motor 7 of monochromator 5.

The form of apparatus described above alows registration of dichroism in the visible and ultra-violet wave lengths.

FIG. 3 shows a modification of the polarization modulator in which the crystal modulator system is replaced by an apparatus comprising a polarizer prism 35 rotating at the frequency $f/2$ and a quarter-wave Fresnel prism 36 of silica. The beam of plane light passes through diaphragm 13, and falls on the Fresnel prism 36 taking successively in the course of a cycle all the orientations. The light from the end of the prism passes from the left circular light to the right circular light while passing all the intermediary light elliptics in a fourth of the way. The function $f(\Omega t)$ of Formula 2 is equal to $\Omega t$. For reasons of mechanics, the frequency $f$ is lower than in the preceding circuit. It is of the order of 20 cycles corresponding to 10 turns a second of the polarizer prism 35 which is turned by a mechanical source 37 connected by belt 38.

FIG. 4 shows a second modification of the apparatus. Polarizer 11 is fixed, but the polarized light beam traverses a magneto-optic system 39, 40 based on Faraday effect, before falling on the Fresnel prism 36. The magneto-optic system allows oscillation of the polarization plane of light at an angle of $\alpha_0 = \pm 45°$ around the average position. It consists of sample holder 40 having faces transparent to ulta-violet light containing a convenient liquid transparent itself to ultra-violet and placed in the axis of an induction coil 39 traversed by an alternating current of frequency $f$. In the absence of the current, the polarizer is regulated in such a manner that the plane of polarization is parallel to a neutral axis of the Fresnel prism 36. While adjusting the intensity in a convenient manner, one passes from left light to right light in a half period. The remainder of the circuit is identical to that described and illustrated in FIGS. 1 and 2. For this modification, the function $f(\Omega t)$ of Formula 2 is written $2\alpha_0 \sin \Omega t$.

The field produced by the coil is very important. It is necessary to provide for a very vigorous cooling of the induction coil.

FIG. 5 shows a third modification applicable to the fixed polarizer apparatus of FIGS. 1 and 4. This modification consists in placing between the polarizer 8 and the modulating system of the polarization of light 15–16, a magneto-optic Faraday cell 41–42, and a polarizer 43 whose plane of polarization is 45° from that of the polarizer 11. Induction coil 42 of the magneto-optic system is supplied with an alternating current, coming after amplification, from the alternating frequency component of the photosignal. The phase of the current is chosen in such a manner that the rotation of the plane of polarization caused by the magneto-optic cell 41–42 provokes a variation in the light flux at the end of second polarizer 43 equal in amount and opposite in sign to that caused by the dichroism of the solution. When the transfer coefficient of the amplifier uniting the Faraday current to the alternating frequency component from the output of the photocell is sufficiently large; this latter can be considered as practically zero.

One shows that in those conditions where $(\epsilon_g - \epsilon_d)Cl$ is very small, the current in the coil 42 is proportional to the circular dichroism. The current in the coil 42 passes through a resistance 44 connected in series with the coil. The voltage developed across this resistance, proportional to $(\epsilon_g - \epsilon_d)Cl$, is rectified by a synchronous rectifier 45 and then recorded by a conventional recording voltmeter.

While I have set forth certain specific embodiments and preferred modes of practice of my invention, it will be understood that they are solely for the purpose of illustration and not intended to be limitative, and that various changes and modifications may be made in the invention without departing from the spirit of the disclosure or the scope of the appended claims.

I claim:

1. Apparatus for the measurement of circular dichroism of an optically active product, which comprises the combination of a light source, monochromator means for forming a monochromatic beam from the light of said source, polarization means for said monochromatic light beam, said polarization means including a modulator of electro-optical character imparting a periodic variation of polarization to said light beam from right to left circular polarization conditions and back, a sample holder for containing said optically active product positioned to provide passage of the modulated and polarized light beam through the sample of said optically active product, an electro-optical converter receiving said light beam and converting it into an electrical signal comprising a direct current component and a periodic fluctuating current component, the periodic fluctuating current component being representative of the difference of absorption of said product for said right and left circular polarization conditions at the wave length of said monochromatic light, and means for directly recording the ratio of said periodic fluctuating current component to said direct current component.

2. Apparatus according to claim 1, wherein said monochromator means includes means to vary the wave length of said monochromatic light beam within a predetermined range of wave lengths at a rate lower than the periodic variations of right to left circular polarization conditions with respect to time.

3. The apparatus of claim 1 wherein said electro-optical converter comprises photomultiplier means, a direct current component separator amplifier, an amplifier permitting amplification without distortion of the periodic fluctuating current component of the output voltage of the photomultiplier, a synchronous rectifying means in synchronization with the recurrence frequency of said modulator of electro-optical character and rectifying the amplified periodic flunctuating current component, and a calibrating circuit of the direct current component of the output voltage of the photomultiplier.

4. The apparatus of claim 1 wherein said monochromator means comprises a quartz prism, entrance and exit slits, means to rotate said prism to vary the wave length of the light passing through the exit slit and means to control said entrance and exit slits in order to maintain constant the direct current component of said electrical signal of said electro-optical converter.

5. The apparatus of claim 1 wherein said modulator of electro-optical character imparting a periodic variation of polarization to said light beam from right to left circular polarization conditions and back comprises a crystal element having a Pocket effect, which is excited by a periodic voltage adjusted with respect to the wave length of said light beam.

6. The apparatus of claim 1 wherein said modulator of electro-optical character imparting a periodic variation of polarization to said light beam from right to left circular polarization conditions and back comprises rotating polarizer elements and a Fresnel prism.

7. The apparatus of claim 1 wherein said modulator of electro-optical character imparting a periodic variation of polarization to said light beam from right to left circular polarization conditions and back comprises a Faraday magneto-optic element and a Fresnel prism.

8. Apparatus for the measurement of circular dichroism of an optically active product which comprises the combination of a light source, monochromator means for forming a monochromatic beam from the light of said source, a first polarization means for said monochromatic beam, said first polarization means including a fixed polarizer and a Faraday magneto-optical element for forming a monochromatic plane polarized beam, the plane of polarization of which is rotated from its initial direction according to the magnitude and sign of the current exciting said magneto-optical Faraday element, a second polarization means for said monochromatic plane-polarized beam with variable plane of polarization, said second polarization means including a second fixed polarizer with its plane of polarization adjusted at 45° from the plane of polarization of the polarizer of said first polarization means, and a modulator of electro-optical character imparting a periodic variation of polarization to said light beam from right to left circular polarization conditions and back, a sample holder for containing said optically active product positioned to provide passage of said polarization modulated light beam through the sample of said optically active product, an electro-optical converter receiving said light beam and converting it into an electrical signal comprising a periodic fluctuating current component, an amplifier amplifying said periodic fluctuating current component and providing the exciting coil of the magneto-optical Faraday element of said first polarization means with this amplified periodic current component, a resistance placed in series with the coil of said magneto-optical Faraday elements for sampling a periodic voltage proportioned to the current flowing in said coil, a synchromonous detector for rectifying the voltage developed across said resistance, and means for directly recording the detected voltage furnished by said synchronous detector.

9. Apparatus according to claim 8 wherein said monochromator means includes means to vary the wave length of said monochromatic light beam within a predetermined range of wave lengths at a rate lower than the periodic variations of right to left circular polarization conditions with respect to time.

10. A method of determining the value of the circular dichroism of an optically active substance comprising the steps of developing a monochromatic light beam of periodically varied polarization from right to left circular polarization conditions and back, passing said beam through an optically active substance, thereby periodically modifying the intensity of said beam, converting said periodically modified beam into an electrical signal comprising a direct current component and a periodic fluctuating current component, the periodic fluctuating current component being representative of the difference of absorption of said optically active substance for said right and left circular polarization conditions and measuring the ratio of said periodic fluctuating current component to said direct current component.

11. The method of claim 10, comprising the step of continuously varying the wave length of said light beam within a predetermined range at a rate lower than that of the periodic change of polarizing applied thereto.

References Cited by the Examiner
UNITED STATES PATENTS

| | | | |
|---|---|---|---|
| 2,768,557 | 10/1956 | Bond | 88—14 X |
| 2,974,561 | 3/1961 | Hardy et al. | 88—65 X |
| 2,976,764 | 3/1961 | Hyde et al. | 88—14 |
| 2,984,149 | 5/1961 | Herscher et al. | |
| 2,999,418 | 9/1961 | Keston | 88—14 |

JEWELL H. PEDERSEN, *Primary Examiner.*

EMIL G. ANDERSON, *Examiner.*

T. L. HUDSON, *Assistant Examiner.*